(12) United States Patent
Tsujiuchi et al.

(10) Patent No.: US 10,926,441 B2
(45) Date of Patent: Feb. 23, 2021

(54) LIQUID SUPPLY MEMBER AND MANUFACTURING METHOD OF LIQUID SUPPLY MEMBER

(71) Applicant: CANON KABUSHIKI KAISHA, Tokyo (JP)

(72) Inventors: Naoko Tsujiuchi, Kawasaki (JP); Yukuo Yamaguchi, Tokyo (JP); Mikiya Umeyama, Tokyo (JP); Satoshi Oikawa, Yokohama (JP); Hiromasa Amma, Kawasaki (JP); Takuya Iwano, Inagi (JP); Satoshi Kimura, Kawasaki (JP); Yasushi Iijima, Tokyo (JP); Kyosuke Toda, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 376 days.

(21) Appl. No.: 15/649,472

(22) Filed: Jul. 13, 2017

(65) Prior Publication Data
US 2018/0029266 A1    Feb. 1, 2018

(30) Foreign Application Priority Data
Jul. 29, 2016    (JP) ............................. JP2016-149858

(51) Int. Cl.
*B29C 45/16*    (2006.01)
*B29C 45/00*    (2006.01)
(Continued)

(52) U.S. Cl.
CPC ...... *B29C 45/1635* (2013.01); *B29C 45/0025* (2013.01); *B29C 45/0062* (2013.01);
(Continued)

(58) Field of Classification Search
CPC .... B29C 2045/0063; B29C 2045/1637; B29C 2045/1682; B29C 45/0025;
(Continued)

(56) References Cited

U.S. PATENT DOCUMENTS

2010/0171798 A1* 7/2010 Yamaguchi .......... B41J 2/16532
347/85
2016/0346967 A1 12/2016 Oikawa et al.
(Continued)

FOREIGN PATENT DOCUMENTS

JP    2002-178538 A    6/2002

OTHER PUBLICATIONS

Iijima et al., U.S. Appl. No. 15/631,120, filed Jun. 23, 2017.
Tsujiuchi et al., U.S. Appl. No. 15/649,482, filed Jul. 13, 2017.

*Primary Examiner* — Matthew J Daniels
*Assistant Examiner* — Yunju Kim
(74) *Attorney, Agent, or Firm* — Venable LLP (57) ABSTRACT

There is provided a liquid supply member capable of suppressing deformation of a liquid supply path and decrease in sealing property of a liquid supply path, during molding, and a manufacturing method of the liquid supply member. For that purpose, in die-slide injection molding that combines two components, a protection portion that protects a part of one component easily affected by heat and pressure, is provided on the other component.

10 Claims, 9 Drawing Sheets

(51) Int. Cl.
    *B41J 2/175*     (2006.01)
    *B29L 31/00*     (2006.01)
    *B29L 23/00*     (2006.01)

(52) U.S. Cl.
    CPC ............ *B41J 2/175* (2013.01); *B41J 2/1752* (2013.01); *B41J 2/17523* (2013.01); *B29C 2045/0063* (2013.01); *B29C 2045/1637* (2013.01); *B29C 2045/1682* (2013.01); *B29L 2023/22* (2013.01); *B29L 2031/767* (2013.01); *B29L 2031/7678* (2013.01)

(58) Field of Classification Search
    CPC ............ B29C 45/0062; B29C 45/1635; B29L 2023/22; B29L 2031/767; B29L 2031/7678; B41J 2/175; B41J 2/1752; B41J 2/17523
    USPC ........................................................ 264/250
    See application file for complete search history.

(56) References Cited

U.S. PATENT DOCUMENTS

| | | |
|---|---|---|
| 2016/0346968 A1 | 12/2016 | Kimura et al. |
| 2016/0346969 A1 | 12/2016 | Toda et al. |
| 2016/0346970 A1 | 12/2016 | Oikawa et al. |
| 2016/0346976 A1 | 12/2016 | Tsujiuchi et al. |
| 2016/0347066 A1 | 12/2016 | Amma et al. |
| 2016/0347072 A1 | 12/2016 | Iwano et al. |
| 2017/0197345 A1* | 7/2017 | Okamoto ............ B29C 44/1219 |

* cited by examiner

LIQUID SUPPLY MEMBER AND MANUFACTURING METHOD OF LIQUID SUPPLY MEMBER

BACKGROUND OF THE INVENTION

Field of the Invention

The present invention relates to a liquid supply member for use in a liquid ejection head that ejects liquid, the liquid supply member having liquid supply paths formed therein, and a manufacturing method of a liquid supply member.

Description of the Related Art

A liquid supply member for use in a liquid ejection head that ejects liquid such as ink is formed with a plurality of liquid supply paths bent therein in order to supply a plurality of types of liquid. Generally, a liquid supply member having such liquid supply paths includes a combination of a plurality of components that is injection molded by the use of a resin material, from the viewpoint of ease of manufacturing, lightness, corrosion resistance, and the like. For example, Japanese Patent Laid-Open No. 2002-178538 discloses a manufacturing method (die-slide injection molding) of separately performing injection-molding of the plurality of components using a same die, and then joining the components by molding using the same die.

In the case of manufacturing a liquid supply member having liquid supply paths formed inside according to the method of Japanese Patent Laid-Open No. 2002-178538, it is possible to set joining precision of the plurality of components to the same degree as dimensional precision of a single component, by molding and joining a plurality of components constituting the liquid supply member, in the same die.

However, a liquid supply member for use in a liquid ejection head may have a complicated shape with liquid supply paths densely arranged therein in order to suppress the size of the liquid ejection head to be small. In such a case, with the method of Japanese Patent Laid-Open No. 2002-178538, there is a concern that, in a case where a portion easily affected by the component to be joined is small and has a complicated shape, the portion may be affected and deformed by heat at the time of joining, or the sealing property of the liquid supply path after joining may decrease.

SUMMARY OF THE INVENTION

Accordingly, the present invention provides a liquid supply member capable of suppressing deformation of a liquid supply path and decrease in sealing property of the liquid supply member, during molding, and a manufacturing method of the liquid supply member.

Accordingly, the manufacturing method of a liquid supply member of the present invention includes: a primary molding process of molding, at different positions in a same die, a first member including a part of a flow path capable of causing liquid to flow and a second member including a member that forms the flow path in combination with the part of the flow path of the first member; a secondary molding process of joining the first member and the second member with a molten resin by relatively moving a first pattern and a second pattern of the die to cause the first member and the second member to face each other and by molding the first member and the second member in an overlapped manner; a process of providing the second member with a thin-wall portion that abuts the first member in a case of joining with the first member; and a process of providing a protection portion that prevents contact between the thin-wall portion and a molten resin, on a upstream side of the thin-wall portion in a direction in which the molten resin flows, on a resin flow path along which the molten resin flows into the thin-wall portion in the first member.

According to the present invention, it is possible to realize a manufacturing method of a liquid supply member capable of suppressing deformation of a liquid supply path and decrease in sealing property of a liquid supply path, during molding.

Further features of the present invention will become apparent from the following description of exemplary embodiments (with reference to the attached drawings).

DESCRIPTION OF THE EMBODIMENTS

First Embodiment

Hereinafter, a first embodiment of the present invention will be described with reference to the drawings.

Figure 1A:
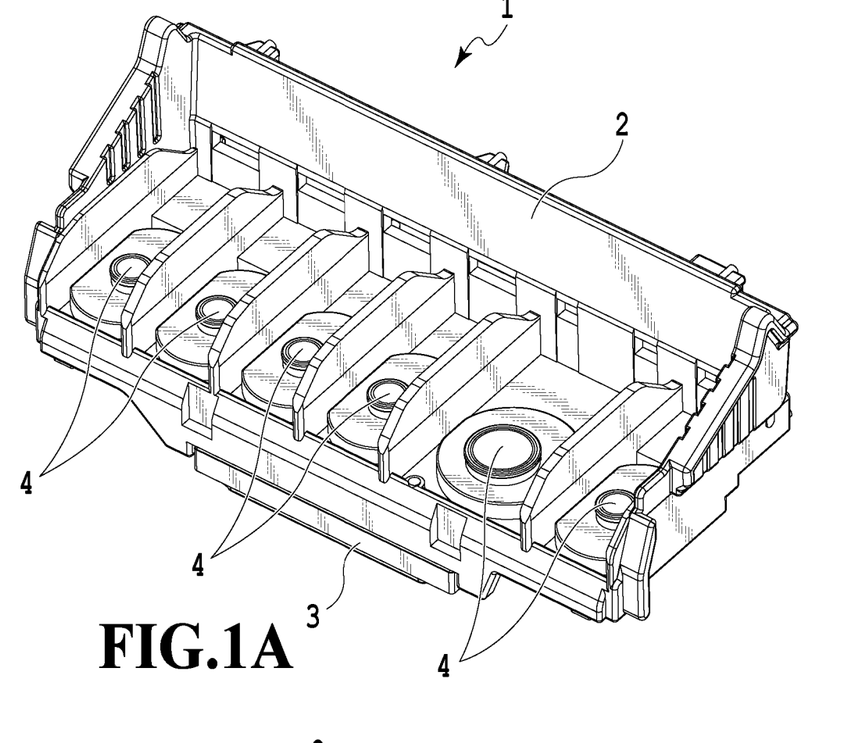
FIG. 1A is a perspective view illustrating a liquid ejection head including a liquid supply member.
Figure 1B:
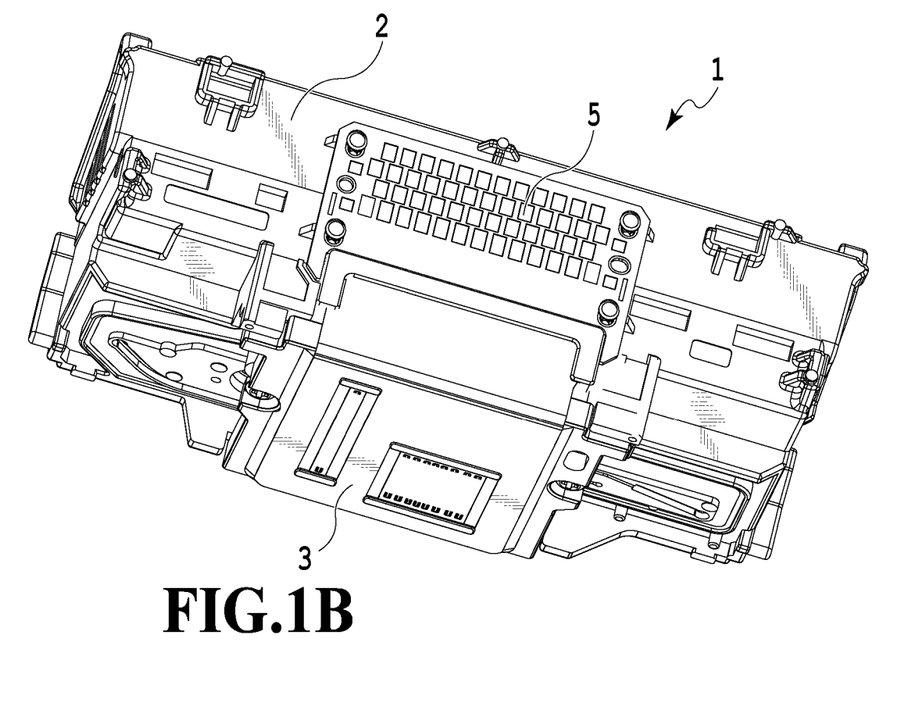
FIG. 1B is a perspective view illustrating a liquid ejection head including a liquid supply member.

FIGS. 1A and 1B are perspective views illustrating a liquid ejection head 1 including a liquid supply member according to the present embodiment. The liquid ejection head 1 that ejects liquid such as ink is mounted on a carriage of a liquid ejection apparatus represented by a so-called serial scan inkjet printing apparatus. Note that the liquid ejection head 1 may have a configuration of being arranged in a so-called full-line liquid ejection apparatus.

The liquid ejection head 1 includes a liquid supply member 2, an ejection element unit 3, and an electrical connection substrate 5. Liquid is supplied from an unillustrated liquid container to the ejection element unit 3 via connecting portions 4 of the liquid supply member 2 and a liquid supply path inside the liquid supply member 2. The ejection element unit 3 has a plurality of ejection ports capable of ejecting liquid arranged therein so as to form an unillustrated ejection port array, and each of the ejection ports is provided with an ejection energy-generating element such as an electric heat conversion element (heater) or a piezoelectric element.

The liquid ejection head 1 has a total of six types of liquids supplied thereto from six connecting portions 4, and each type of liquid is ejected from an ejection port array corresponding to each of the connecting portions 4. The liquid supply member 2 is formed with a liquid supply path communicating between the six connecting portions 4 and the ejection port array corresponding thereto. Since the adjacent space of the ports in the corresponding ejection port array is smaller than the adjacent space among the six connecting portions 4, there is also included a liquid flow path having a bent shape. Driving of the ejection energy-generating element by an unillustrated liquid ejection apparatus through the electrical connection substrate 5 is caused to eject liquid from the corresponding ejection port.

Figure 2A:
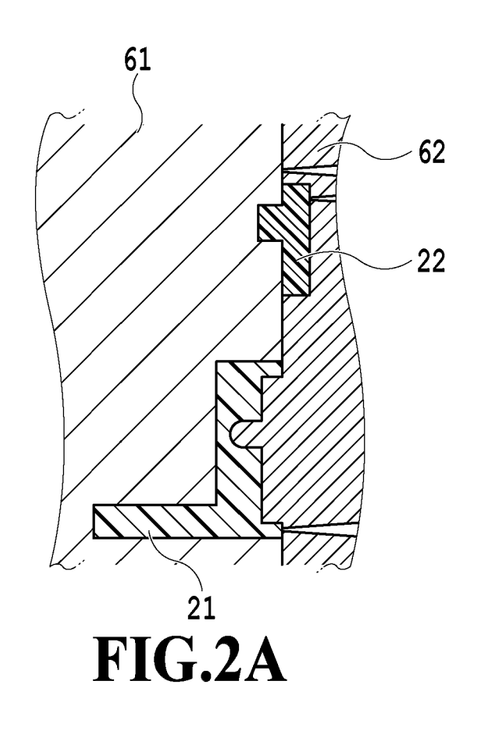
FIG. 2A is a diagram illustrating a primary molding process in manufacturing of a liquid supply member.
Figure 2B:
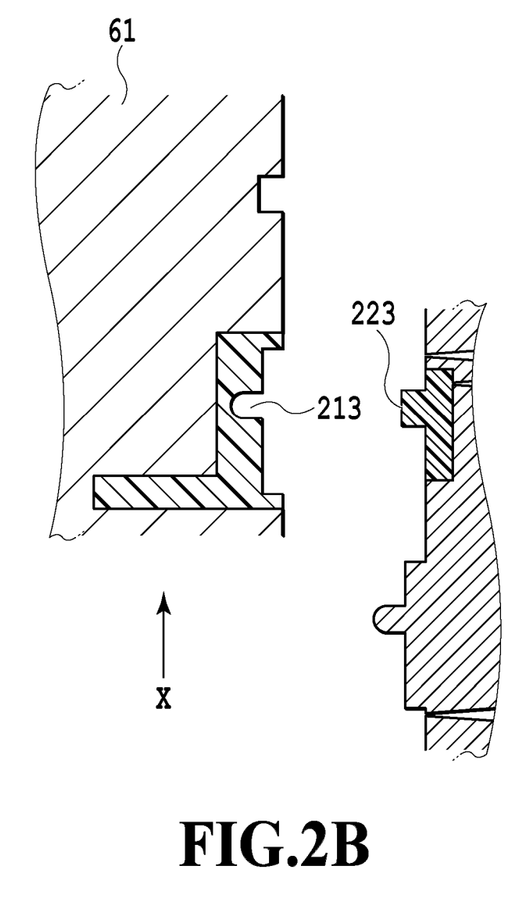
FIG. 2B is a diagram illustrating a primary molding process in manufacturing of a liquid supply member.
Figure 3A:
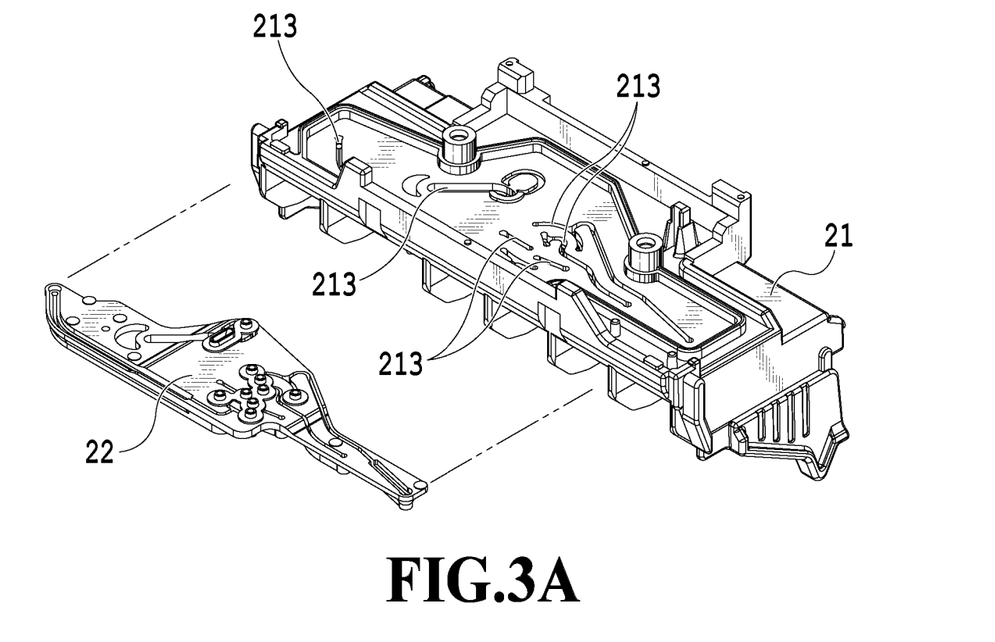
FIG. 3A is a view illustrating a positional relation of molding parts in a first process.
Figure 3B:
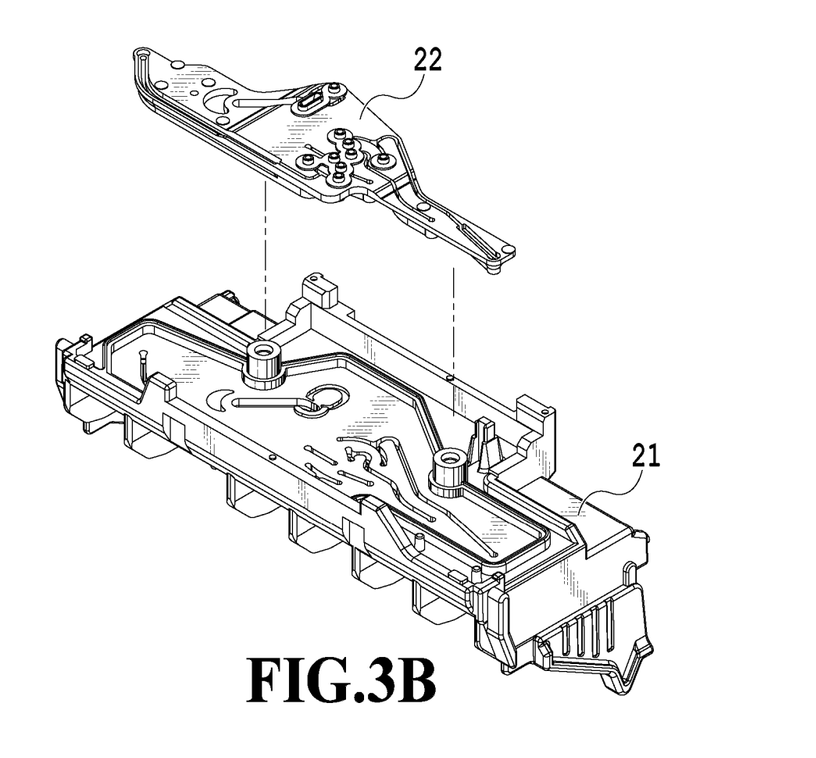
FIG. 3B is a view illustrating a positional relation of molding parts in a second process.

FIGS. 2A and 2B are diagrams illustrating a first process and a second process which are primary molding processes in manufacturing of the liquid supply member 2. Die-slide injection molding is used as the manufacturing method of the liquid supply member 2. FIGS. 2A and 2B are schematic cross-sectional views of a die and a molding part in the first and the second processes during the manufacturing process. In addition, FIGS. 3A and 3B are views illustrating a positional relation of molding parts in the first and the second processes.

In the first process, a first component 21 and a second components 22 constituting the liquid supply member 2 are injection molded inside dies 61 and 62 by a resin material, as illustrated in FIG. 2A. The first component 21 is molded between a first position of the die (first die) 61 and a first position of the die (second die) 62, and the second component 22 is molded between a second position of the die 61 and a second position of the die 62. The resin material for molding the liquid supply member 2 is supplied through gates 621 and 622 provided inside the die 62. The die 61 is slidable along an arrow X direction as illustrated in FIG. 2B. By the use of an unillustrated movement mechanism, the dies 61 and 62 are relatively moved in a die-clamping direction and a die-opening direction, and the die 61 is moved in the arrow X direction and a direction opposite thereto.

The first component 21 is formed with a groove portion (portion forming the liquid supply path) 213 serving as a part of the liquid supply path. The second component 22 is formed with a lid portion 223 which forms the liquid supply path together with the groove portion 213 by closing a lid of the groove portion 213. The lid portion 223 has a width that is larger than a width of the groove portion 213 so as to entirely block an opening of the groove portion 213 (see FIG. 2B). In the present embodiment, a same resin material including filler is used as the molding material of the first component 21 and the second component 22.

In the second process, the dies 61 and 62 are opened as illustrated in FIG. 2B, and then the die 61 holding the first component 21 is caused to slide in the arrow X direction (either the upper die or the lower die is caused to slide). Accordingly, the first component 21 is caused to face the second component 22 held on the die 62. Thereby, a region (first region) A1 around the groove portion 213 and a region (second region) A2 of the lid portion 223 being positioned around the groove portion 213 and protruding from the groove portion 213 in the width direction face each other at a same position, as illustrated in FIG. 3B.

Figure 4A:
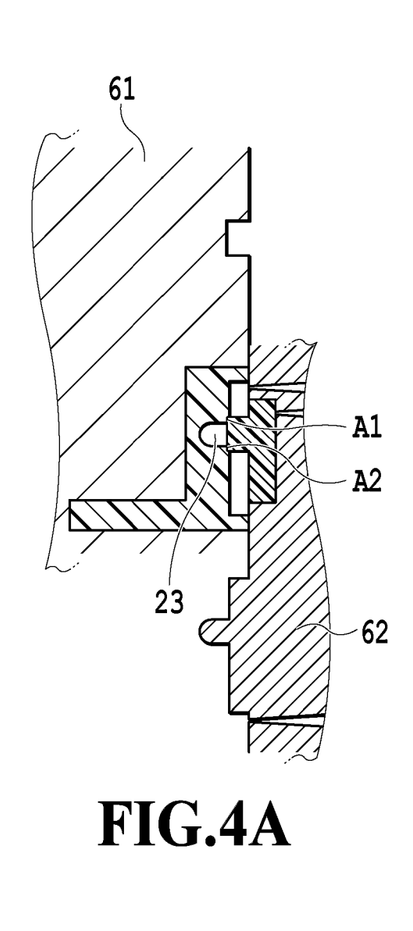
FIG. 4A is a diagram illustrating a secondary molding process in manufacturing of a liquid supply member.
Figure 4B:
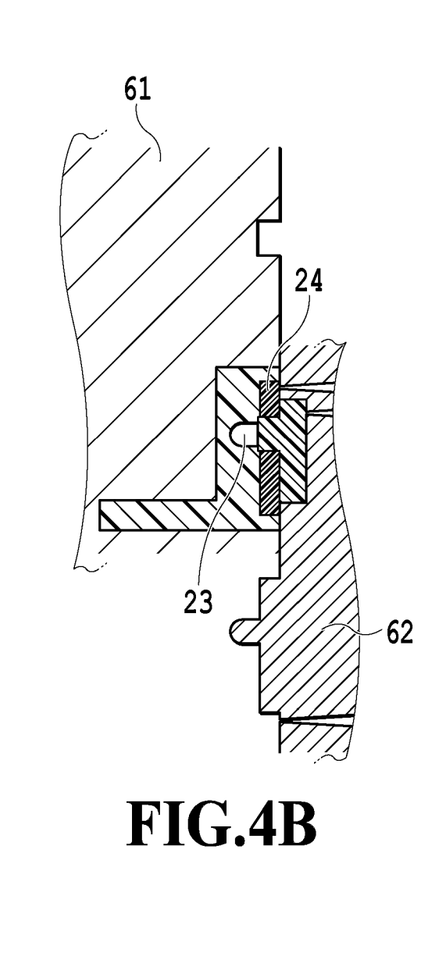
FIG. 4B is a diagram illustrating a secondary molding process in manufacturing of a liquid supply member.
Figure 4C:
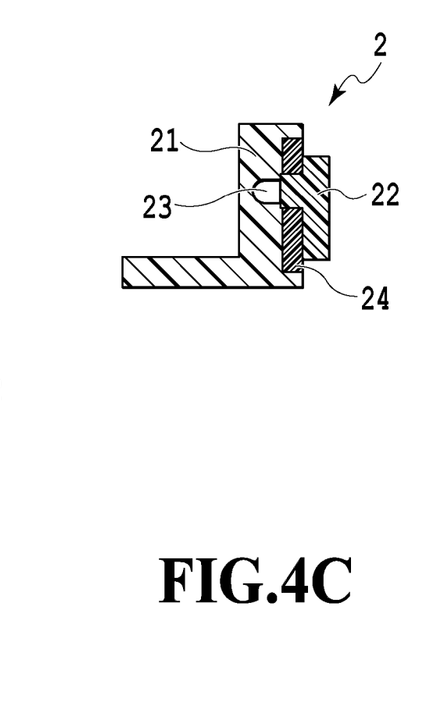
FIG. 4C is a diagram illustrating a liquid supply member.
Figure 5A:
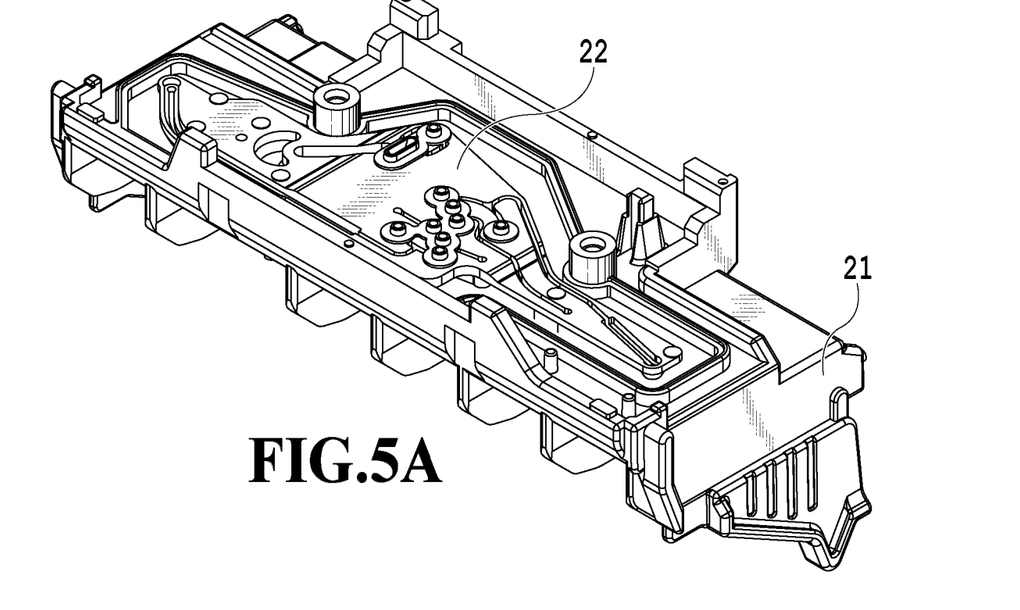
FIG. 5A is an explanatory view of a positional relation of molding parts in a third process.
Figure 5B:
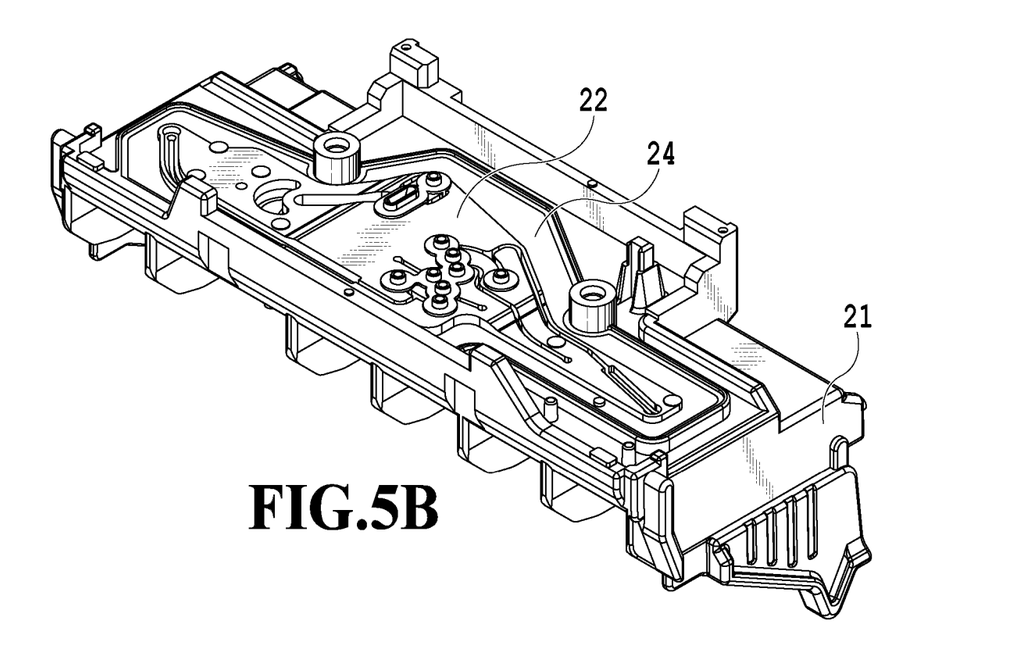
FIG. 5B is an explanatory view of a positional relation of molding parts in a fourth process.

FIGS. 4A to 4C are diagrams illustrating a third process and a fourth process which are a secondary molding process in manufacturing of the liquid supply member 2. FIGS. 4A and 4B are schematic cross-sectional views of a die and a molding part in the third and the fourth processes, and FIG. 4C is a diagram illustrating a cross section of the liquid supply member 2 taken out of the die. In addition, FIGS. 5A and 5B are explanatory views of a positional relation of molding parts in the third and the fourth processes.

In the third process, as illustrated in FIG. 4A, the dies 61 and 62 are clamped again and thus the regions A1 and A2 are made to abut on each other. Accordingly, a liquid supply path 23 is formed in the groove portion 213 closed by the regions A1 and A2, and the first component 21 and the second component 22 are brought into an overlapped state, as illustrated in FIG. 5A.

In the fourth process, as illustrated in FIG. 4B, a molten resin is poured into a region outside the regions A1 and A2 to form a sealing member 24. The molten resin used for forming the sealing member 24 is supplied through a gate provided in the die 62. Solidification by compatibility of the supplied molten resin with the first and the second components causes the first component 21 and the sealing member 24 to be joined and be integrated, also causes the second component 22 and the sealing member 24 to be joined and be integrated, and thus the liquid supply member 2 is constituted, as illustrated in FIGS. 4C and 5B. At this time, a portion of the regions A1 and A2 may also exhibit compatibility due to heat of the molten resin. Subsequently, the liquid supply member 2 constituted by the first component 21, the second component 22, and the sealing member 24 is taken out of the dies 61 and 62 as illustrated in FIG. 4C.

In the present embodiment, the same resin material as that of the first component 21 and the second component 22 is used as the molten resin. The resin material forming the sealing member 24 may be a material of any type which exhibits compatibility with the first component 21 and the second component 22 and may be a material different from that of the first component 21 and the second component 22.

As illustrated in FIG. 1A, with regard to the posture in use of the liquid ejection head 1 having the ejection element unit 3 located therebelow, the groove portion 213 and the lid portion 223 of the liquid supply member 2 extend in a horizontal plane. Namely, the liquid supply path formed by the groove portion 213 and the lid portion 223 includes a portion extending along the horizontal plane, with regard to posture in use of the liquid ejection head 1. In FIG. 3A, the first component 21 is formed with a plurality of the groove portions 213 for forming liquid supply paths corresponding to each of six types of liquids, and the second component 22 is formed with the unillustrated lid portion 223 corresponding to the groove portions 213. In addition, with regard to the posture in use of the liquid ejection head 1, the liquid supply path extends in the vertical direction, in a portion in the vicinity of the connecting portion 4 (see FIG. 1A) and in a portion in the vicinity of the connecting portion with the ejection element unit 3. A bent portion is formed in the connecting portion between a part extending in the vertical direction of the liquid supply path and a part extending along the horizontal plane.

(Characteristic Configuration)

Hereinafter, a characteristic configuration in the present invention will be described.

Figure 6A:
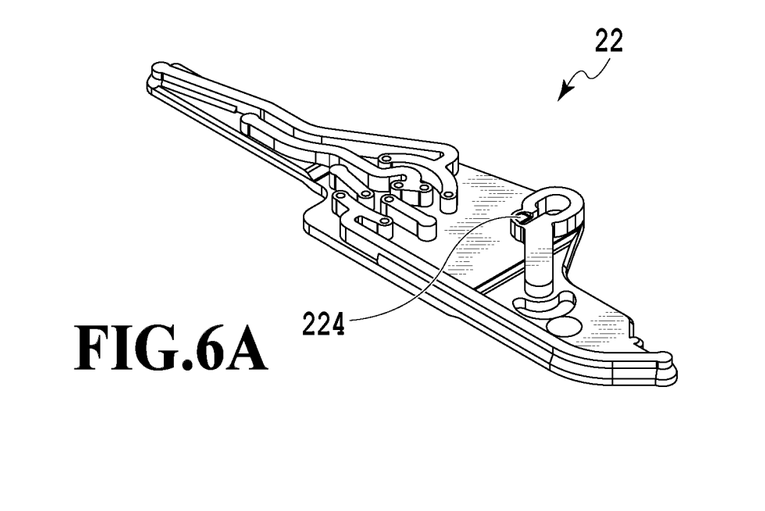
FIG. 6A is a view illustrating a second component.
Figure 6B:
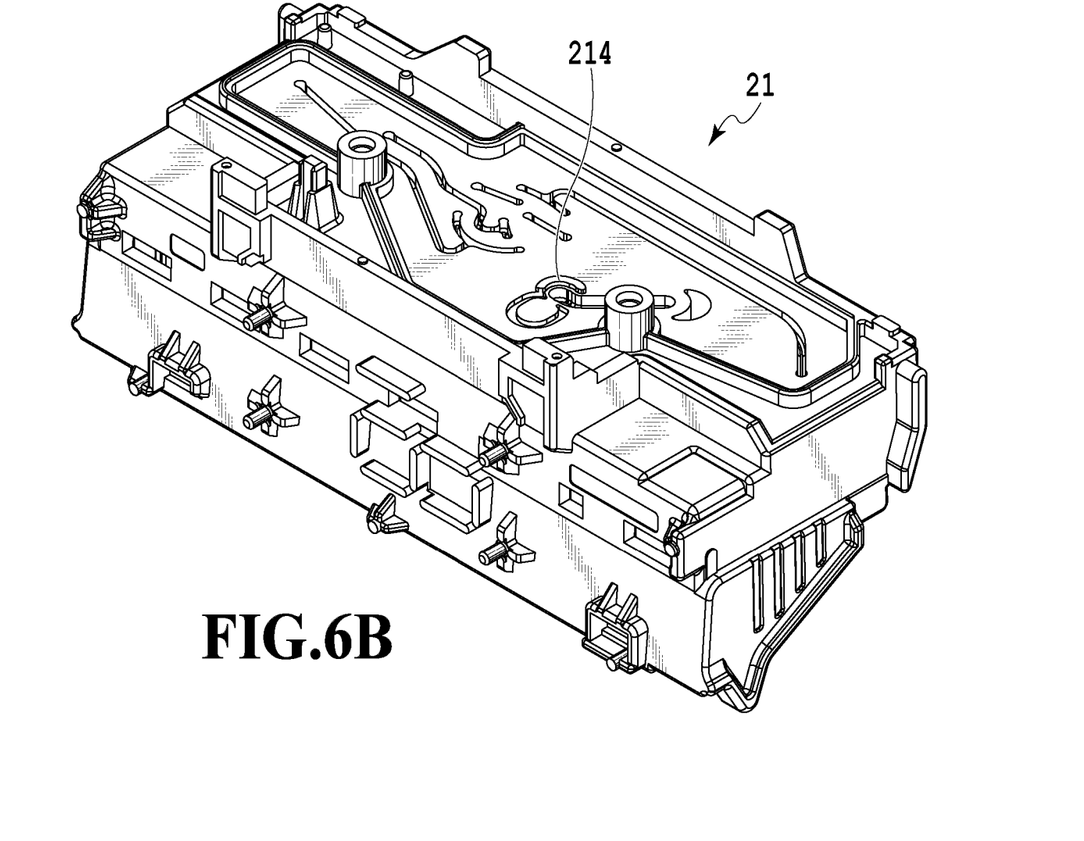
FIG. 6B is a view illustrating a first component.
Figure 7A:
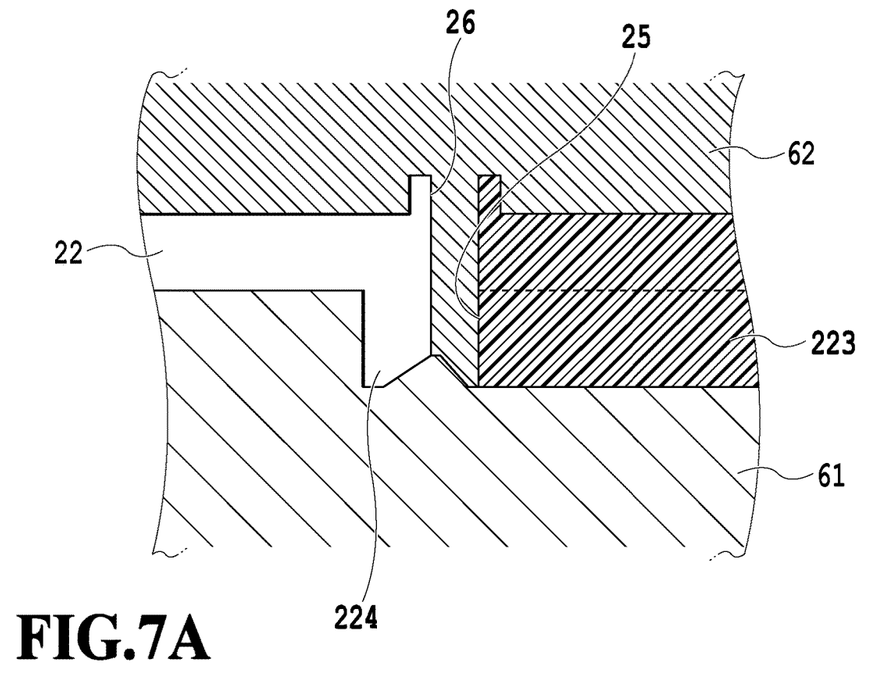
FIG. 7A is a diagram illustrating a cross section in a vicinity of a joining portion between the second component and an ejection element unit.
Figure 7B:
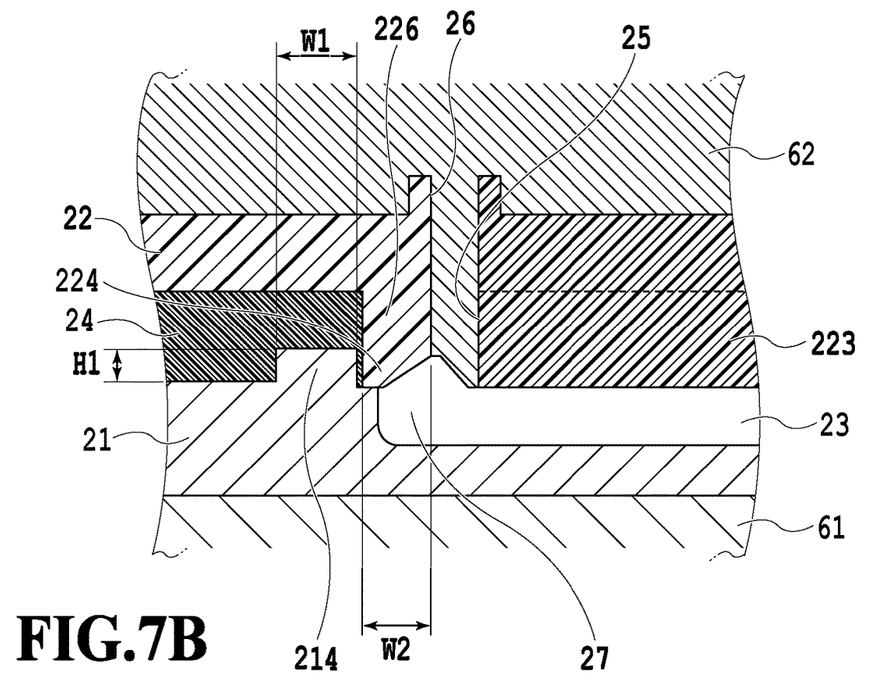
FIG. 7B is a diagram illustrating a cross section in a vicinity of a joining portion between the second component and an ejection element unit.

FIG. 6A is a view illustrating the second component 22, and FIG. 6B is a view illustrating the first component 21. In addition, FIG. 7A is a view illustrating a cross section in the vicinity of the joining portion between the second component 22 and the ejection element unit 3 in the first process, and FIG. 7B is a view illustrating a cross section in the vicinity of the joining portion between the liquid supply member 2 and the ejection element unit 3 in the fourth process.

The second component 22 is provided with a liquid supply path 25 extending in a vertical direction so as to be connected from a terminal end portion of a liquid supply path 23 in the horizontal plane, and the end portion of the liquid supply path 25 is provided with an opening 26 connected to the ejection element unit 3.

A control unit 27 for controlling the liquid flow is provided at the connecting portion between the liquid supply path 23 in the horizontal plane and the liquid supply path 25 in the vertical direction. The control unit 27 is formed in a concave shape straddling the first component 21 and the second component 22 so that the liquid supply path 23 extends beyond a position where the liquid supply path 25 and liquid supply path 23 are connected, in a supply direction along which the liquid is supplied from the liquid supply path 23 to the liquid supply path 25.

A tapered portion 224 being a part of the control unit 27 included in the second component 22 has an inclined surface expanding a space in a direction toward the first component 21. The tapered portion 224 serves as a thin-wall portion having a smaller thickness than other components. In addition, a protection portion 214 is provided (on the resin flow path), as a part of the flow path into which resin flows, on an upstream side in the inflow direction along which resin flows into the tapered portion 224 in the fourth process, so as to surround a part at which the tapered portion 224 and the first component 21 abut each other at the time of joining.

In the first process, the tapered portion 224 is molded by the use of the die 61 at a movable side. Namely, the tapered portion 224 is in a state of not coming into contact with the die in the second and subsequent processes. In pouring the molten resin (the sealing member 24) in the fourth process, direct contact of the molten resin with a member forming the tapered portion 224 may cause deformation of the tapered portion 224 due to pressure or heat, whereby a desired shape of the liquid supply path may not be obtained. In addition, the molten resin may flow into the liquid supply path in a case where deformation is large, thereby blocking the liquid supply path.

Accordingly, the present embodiment provides, in a part of the flow path into which the molten resin flows in the fourth process, the convex-shaped protection portion 214 so that the molten resin does not come into direct contact with the member forming the tapered portion 224. In this way, heat and pressure are prevented from being directly transmitted from the molten resin to the tapered portion 224, whereby it is possible to suppress deformation of the tapered portion 224. As illustrated in FIG. 7B, in a case where the die 61 and the die 62 are clamped and the first component 21 and the second component 22 are overlapped, one side surface of the thin-wall portion provided in the second component 22 (the tapered portion 224) is adjacent to one side surface of the convex-shaped protection portion 214 provided in the first component 21. In the above state, the molten resin is caused to flow toward the back side of the one side surface of the protection portion 214 in an inflow path (region of the sealing member 24) into which the molten resin flow.

Figure 8:
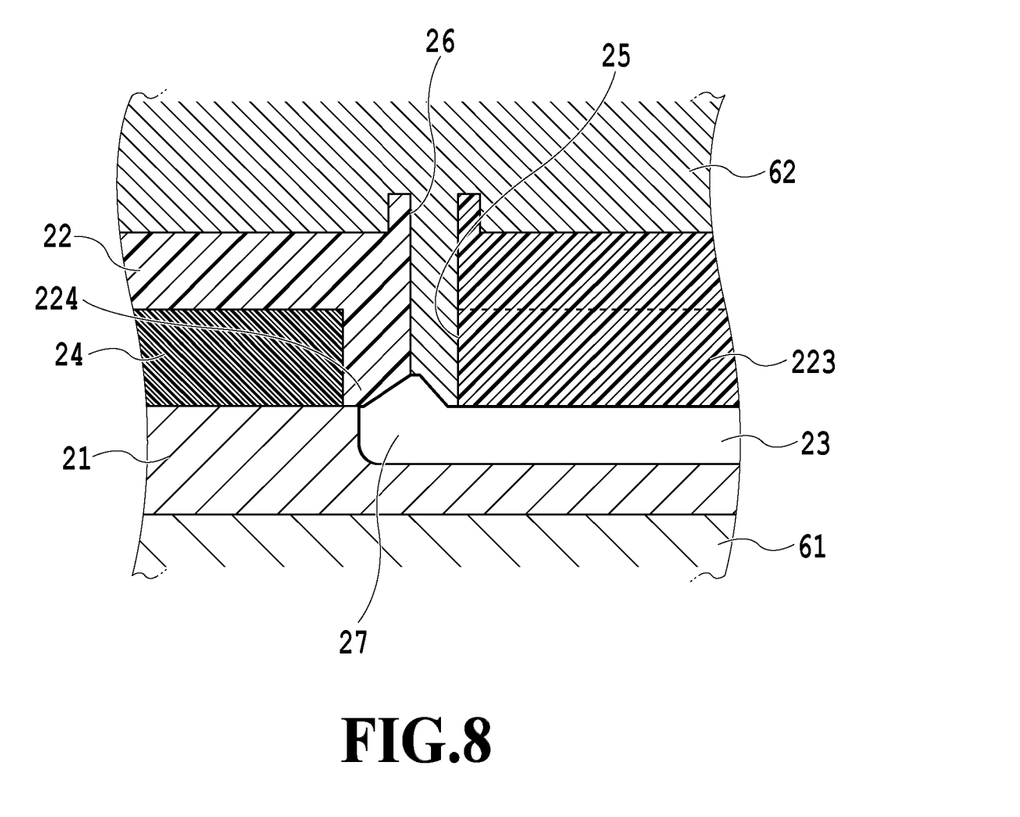
FIG. 8 is a diagram illustrating deformation of a tapered portion in a case where a protection portion is not provided as a comparative example.

FIG. 8 is a diagram illustrating, as a comparative example, deformation of the tapered portion 224 which may be generated in a case where the protection portion 214 is not provided. In the case where the protection portion 214 is not provided, the molten resin having flowed in comes into direct contact with the member forming the tapered portion 224. At this time, the tapered portion 224 having been thinned is easily affected by heat and pressure. Accordingly, as illustrated in FIG. 8, the tapered portion 224 is deformed, and there is also a possibility that the molten resin may flow into the control unit 27 (into the liquid supply path) from a part which should have been joined with the tapered portion 224, thereby blocking the liquid supply paths 23 and 25.

In the present embodiment, the protection portion 214 has a shape in which the width W1 is larger than the height H1. In addition, the protection portion 214 has a rectangular cross-sectional shape with the height H1 and the width W1, on a surface defined by an axis in a direction in which the molten resin flows into the tapered portion and an axis in a direction in which the first component 21 and the second component 22 are caused to abut. Furthermore, the shape of the protection portion 214 seen from the vertical direction (the upper part of the drawing) is provided in accordance with the shape of a part into which the molten resin (the sealing member 24) flows. Namely, the protection portion 214 is provided so that the molten resin having flowed in prevents contact with the member forming the tapered portion 224. Note that a base portion 226 of the member on which the tapered portion 224 is not formed is distant from the tapered portion 224, and thus contact with the molten resin does not affect the tapered portion 224 directly due to heat and pressure. Accordingly, the base portion 226 has a configuration of coming into contact with the molten resin having flowed in.

In addition, the width W1 of the protection portion 214 is made larger than the width W2 of the tapered portion. Additionally, the height H1 of the protection portion 214 is provided larger than the height of the taper of the tapered portion 224.

Note that, in a case where the flow region of the molten resin is narrow, there is also a possibility that the protection portion may make the flow region narrower and obstruct the flow of the molten resin. In such a case, the flow protection wall may have a shape tapering toward the tip from the base in order to secure the flow region of the molten resin.

In addition, although the first component is provided with a protection portion in the present embodiment, the first component may also have a configuration of including a protection portion that protects a part of the second component easily affected by heat and pressure.

As thus described, in die-slide injection molding that combines two components, the other component is provided with a protection portion that protects a part of one component easily affected by heat and pressure. Accordingly, there have been able to be realized a liquid supply member capable of suppressing deformation of a liquid supply path and decrease in sealing property of a liquid supply path, during molding, and a manufacturing method of the liquid supply member.

Second Embodiment

Hereinafter, a second embodiment of the present invention will be described with reference to the drawings. Note that, since the basic configuration of the present embodiment is similar to that of the first embodiment, only a characteristic configuration will be described below.

Figure 9:
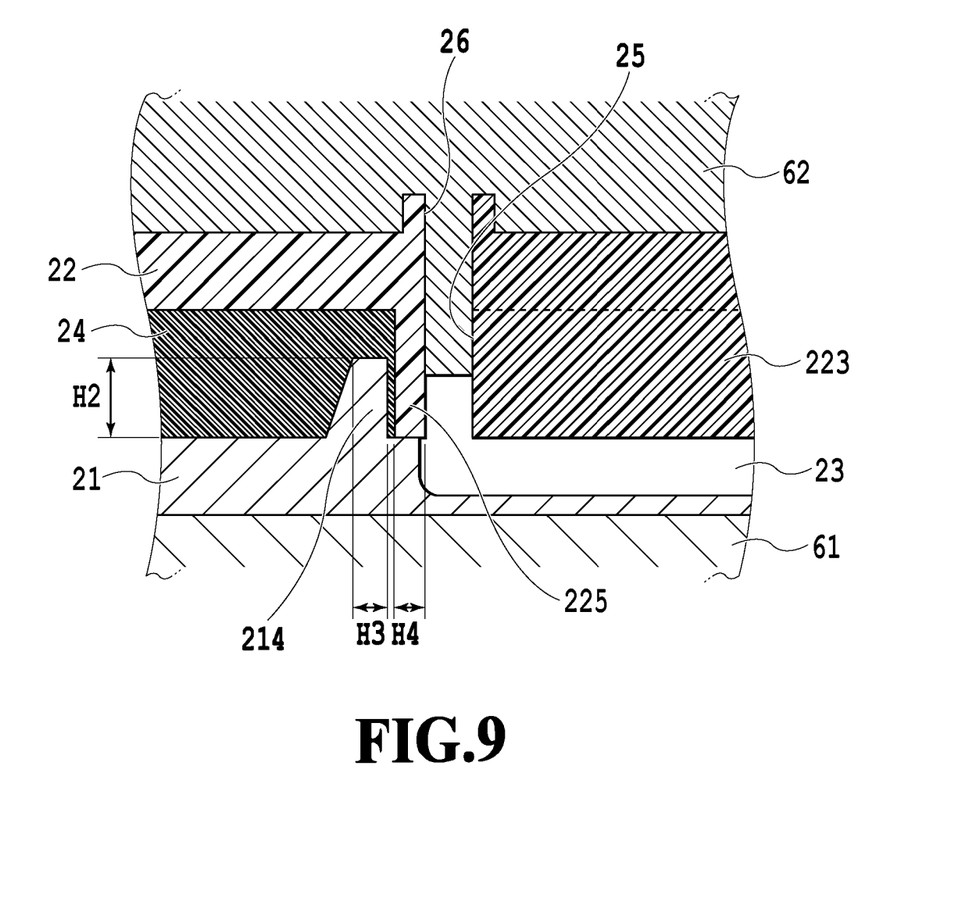
FIG. 9 is a diagram illustrating a cross section near a joining portion between a liquid supply member and an ejection element unit.

FIG. 9 is a diagram illustrating a cross section in the vicinity of the joining portion between the liquid supply member 2 and the ejection element unit 3 in the fourth process of the present embodiment. When formation is carried out in a state where a part of the die 62 is in a state of being inserted within all the liquid supply path 25, there is a fear that a part of the die 62 becomes easily damaged. Thus, the present embodiment has a configuration in which the die is divided in the middle of the liquid supply path 25, and in the first process, a part of the liquid supply path 25 is formed by the use of the die 61. In this case, a part of the member forming the liquid supply path 25 serves as a part that does not come into contact with the die in the second and subsequent processes, similarly to the first embodiment.

Furthermore, the part of the member forming the liquid supply path 25 serves as a thin-wall portion 225 as illustrated in FIG. 9. The thin-wall portion 225 described above may be affected by heat and pressure to thereby be deformed, in a case of coming into contact with the flowed in molten resin.

Accordingly, in the present embodiment, the first member is provided with the convex-shaped protection portion 214, and thus heat and pressure are not easily applied in the fourth process to the thin-wall portion 225 that does not come into contact with the die, in the second and subsequent processes. The height H2 of the protection portion 214 in the present embodiment is provided higher than the tip position of the die 62 in the liquid supply path 25, in the fourth process. In addition, in a case where a configuration is such that the width H3 of the protection portion 214 is made thicker than the width H4 of the thin-wall portion 225, the cross section may have a trapezoidal shape as illustrated in the drawing.

As thus described, in die-slide injection molding that combines two components, a protection portion that protects a part of one component easily affected by heat and pressure is provided in the other component. Accordingly, there have been able to be realized a liquid supply member capable of suppressing deformation of a liquid supply path and decrease in sealing property of a liquid supply path, during molding, and a manufacturing method of the liquid supply member.

Note that, in the first and the second embodiments, the protection portion has been provided for the purpose of reducing deformation of the thin-wall portion in the liquid supply path-forming portion. However, also in a case where a contour of the molten resin flow region is defined by the first or the second one of the components, there is an effect of preventing outflow of the molten resin to the outside by provision of a protection portion in the other member.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-149858, filed Jul. 29, 2016, which is hereby incorporated by reference wherein in its entirety.

What is claimed is:

1. A manufacturing method of a liquid supply member, the method comprising:
a primary molding process of molding, at different positions in a same die, a first member including a part of a flow path capable of causing liquid to flow and a second member including a member that forms the flow path by being combined with the part of the flow path of the first member;
a secondary molding process of joining the first member and the second member with a molten resin by relatively moving a first pattern and a second pattern of the die to cause the first member and the second member to face each other and by molding the first member and the second member in an overlapped manner;
a process of forming a liquid supply wall constituting the flow path on an end portion side of an inflow path of the second member in which the molten resin flows, and a process of forming a convex-shaped protection portion on the end portion side of the inflow path of the first member, in the primary molding process, the liquid supply wall including a thick-wall portion and a thin-wall portion connected to the thick wall portion and having a tapered shape having an inclined surface; and
a process of making one side surface of the thin-wall portion and one side surface of the protection portion adjacent and opposed to each other to thereby overlap the first member and the second member, in the secondary molding process, the protection portion being provided at a position corresponding to an entire area of the thin-wall portion,
wherein in a state in which the secondary molding process is finished, another side surface of the protection portion, which is a back surface of the one side surface of the protection portion, is in contact with the molten resin.

2. The manufacturing method according to claim 1, wherein contact between the thin-wall portion and the protection portion prevents contact between the thin-wall portion and the molten resin.

3. The manufacturing method according to claim 1, further comprising a process of forming a cross-sectional shape of the protection portion to be rectangular, on a surface defined by an axis in a direction in which the molten resin flows into the thin-wall portion and an axis in a direction in which the first member and the second member are caused to abut.

4. The manufacturing method according to claim 1, further comprising a process of forming a width of the protection portion in a direction in which the molten resin flows to be larger than a width of the thin-wall portion in the direction in which the molten resin flows.

5. The manufacturing method according to claim 1, wherein connection between the first member and the second member causes the flow path and a supply path to be connected.

6. The manufacturing method according to claim 1, wherein the method causes the molten resin to flow into the inflow path, and causes the molten resin to flow toward the other side surface of the protection portion, in the secondary molding process.

7. The manufacturing method according to claim 1, wherein a back side of the one side surface of the thin-wall portion is a part of a supply path capable of causing liquid to flow.

8. The manufacturing method according to claim 7, wherein a part of a die is inserted into a part of the supply path, in the secondary molding process.

9. The manufacturing method according to claim 8, wherein the protection portion prevents contact between the thin-wall portion of a portion of the supply path in which the die is not inserted, and the molten resin.

10. The manufacturing method according to claim 8, further comprising a process of forming a cross-sectional shape of the protection portion to be a shape that tapers toward a tip from a base, on a surface defined by an axis in a direction in which the molten resin flows into the thin-wall portion and an axis in a direction in which the first member and the second member are caused to abut.

\* \* \* \* \*